Nov. 20, 1962 J. G. THOMAS 3,064,825
POWER CONTROLLED OUTRIGGERS FOR MOTOR CRANES
Filed March 31, 1960 3 Sheets-Sheet 1

James G. Thomas
INVENTOR.

BY *Clarence A O'Brien*
*and Harvey B. Jacobson*
Attorneys

Nov. 20, 1962   J. G. THOMAS   3,064,825
POWER CONTROLLED OUTRIGGERS FOR MOTOR CRANES
Filed March 31, 1960   3 Sheets-Sheet 2
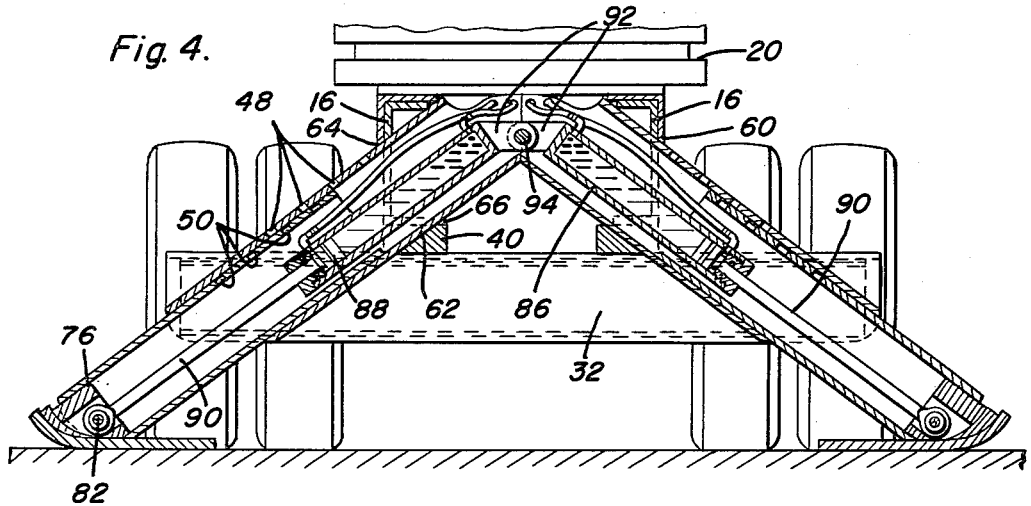
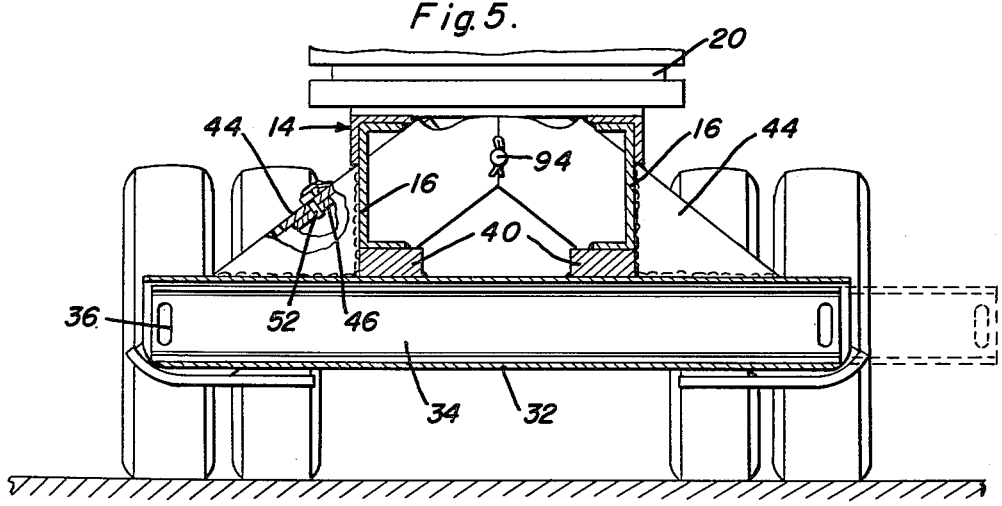
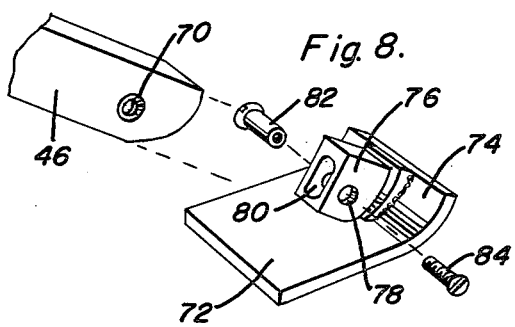
James G. Thomas
INVENTOR.

James G. Thomas
INVENTOR.

United States Patent Office 3,064,825
Patented Nov. 20, 1962

3,064,825
POWER CONTROLLED OUTRIGGERS FOR MOTOR CRANES
James G. Thomas, 157 N. Forrest Ave., Camden, Tenn.
Filed Mar. 31, 1960, Ser. No. 18,948
16 Claims. (Cl. 212—145)

This invention comprises novel and useful combined power and manually operated outriggers for carrier frames and more particularly relates to an outrigger bracing structure for imparting greater lateral stability to cranes and similar vehicles.

The primary object of this invention is to provide a stabilizer construction mounted upon the chassis of wheeled vehicles which will enable the attaining of a much greater lateral stability for such vehicles as power operated cranes, draglines, shovels, clamshells and trench hoes and the like.

A further object of the invention is to provide a stabilizer construction accordance with the preceding object which will enable the use of power operating means thereby greatly facilitating the utilization of the stabilizer.

Another object of the invention is to provide a stabilizer construction as set forth in the preceding objects which will combine in an improved manner a conventional manually operated lateral stabilizer with a power operated stabilizer.

A still further important object of the invention is to provide a stabilizer construction in accordance with preceding objects wherein a conventional manually operated stabilizer is combined with a power operated stabilizer in such a manner as to obtain a much more rigid bracing between both stabilizers and between the frame of the vehicle.

Yet another object of this invention is to provide a hydraulically operated extensible stabilizer of such construction that while the power operating means effects positive extension and retraction of the stabilizer legs, the weight of the vehicle disposed thereon is carried wholly or in large part solely by the structure of the extensible stabilizer and its mounting and bracing structure and not by the hydraulic jack elements disposed therein and connected thereto.

It is a still further object of the invention to provide a stabilizer construction in which the power operated stabilizer components shall be capable of being locked releasably in selectively retracted or extended positions in order that the stabilizer may in no way interfere with the mobility of the vehicle when retracted, wherein the stabilizer may be readily available for use as desired, and wherein the stabilizer may be securely maintained in its extended position even in the event of a failure in the power operating means of the stabilizer.

A further and more specific object of the invention is to provide a stabilizer construction in which stabilizer elements are associated with and rigidly secured to the side frame members of the chassis of a vehicle in a very compact manner and yet in a manner in order to afford a very rigid bracing therebetween.

Still another important object of the invention is to provide power and manually operated stabilizer constructions wherein upon retraction of the power operated stabilizer, the manually operated stabilizer will be retained by the former in retracted position, and whereby the power operated stabilizer shall be so constructed and mounted as to permit ready access thereto for servicing or disassembling.

And a final important object of the invention to be specifically enumerated herein resides in the provision of a stabilizer construction which shall include power operating means therefor which are compactly sheltered and housed within telescoping upper and lower members of extensible jacks; and wherein the power operating means shall be directly connected to the lower member of each jack and to a detachable shoe by a common fastening means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a view in vertical transverse section taken substantially upon the plane indicated by the section line 4—4 of FIGURE 1 but upon an enlarged scale and showing the power operated stabilizer jacks in their extended position but with the manually operated stabilizer in retracted position;

FIGURE 5 is a view in vertical transverse section taken substantially upon the plane indicated by the section line 5—5 of FIGURE 1 but upon an enlarged scale and showing the manually operated stabilizer construction with one of the extensions being shown in its extended position in dotted lines therein;

Figure 6:
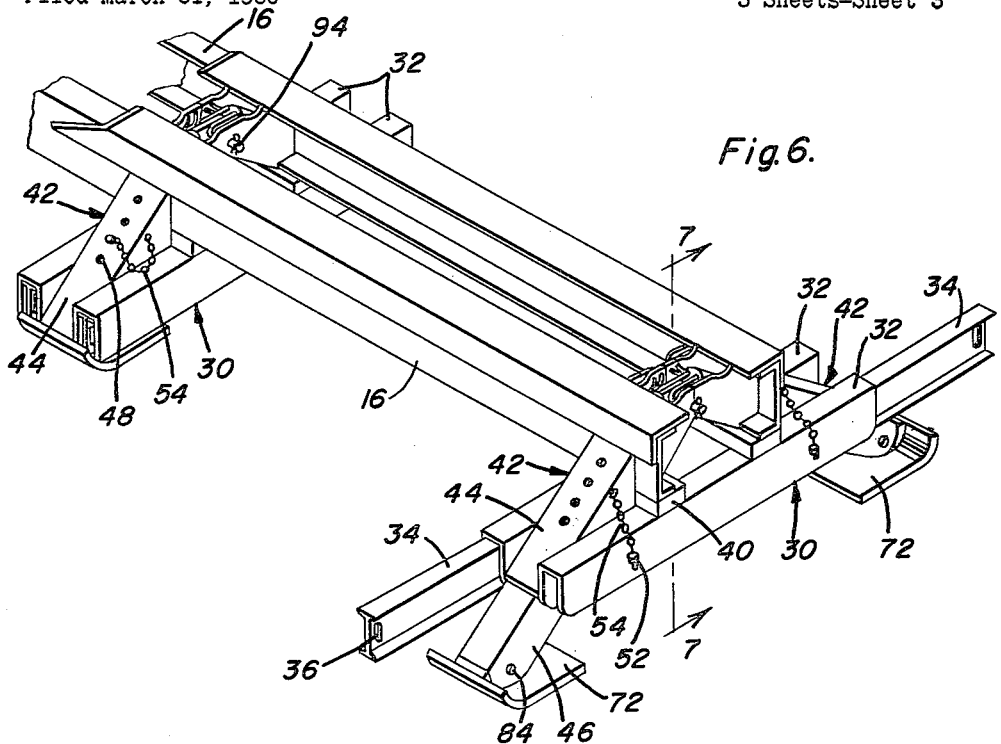
Figure 7:
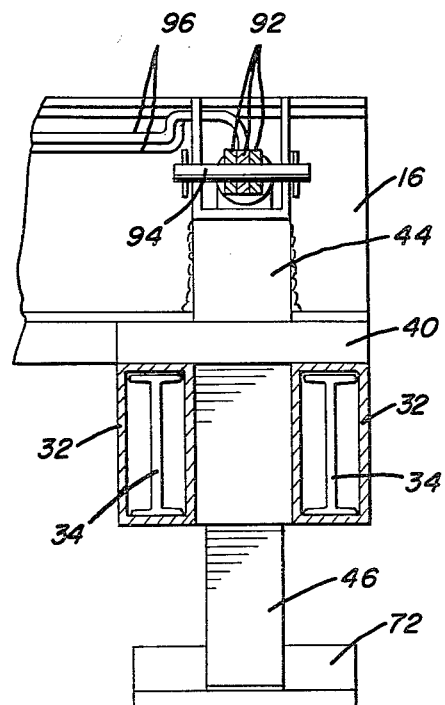

FIGURE 6 is a perspective view of the stabilizer construction shown secured to a pair of side frame members forming a part of the chassis of a vehicle, a portion of the frame members being broken away and other portions of the vehicle chassis being omitted therefrom, one set of manually operated and power operated stabilizers being shown in their extended positions with the other set being shown in retracted position therein;

FIGURE 7 is a vertical transverse sectional detail view taken substantially upon the plane indicated by the section line 7—7 of FIGURE 6; and, FIGURE 8 is a detail view in exploded perspective and showing the manner in which a foot member is pivotally connected to the lower end of a lower member of an extensible jack of the power operated stabilizer.

It is well known to those conversant with the uses and the problems attending the use of power operated cranes and similar vehicles such as draglines, excavating machines and the like that additional stabilizing means are necessary in order to impart additional rigidity and stability to the chassis of the vehicle when the equipment thereon is operated to produce a lateral pull or force upon the vehicle. It has been conventional practice to provide an outrigger construction for such vehicles consisting of a pair of cross members secured to the underside of the side frame members of the vehicle and extending transversely and laterally therefrom and with these cross members being in turn provided with longitudinally slidable extensions which may be moved between a retracted position to an extended position, in which latter position the ends of the extension are carried by suitable supports and serve to increase the stability of the chassis against lateral tilting about the longitudinal axis of the vehicle.

It is frequently difficult, however, and frequently time consuming upon various terrains to properly position the manually operated outriggers of the stabilizer construction in order to secure a firm support base for the vehicle. It is the basic purpose of this invention to overcome this difficulty by providing and combining with such conventional manually operated outrigger stabilizer constructions a power operated outrigger construction which shall be capable of operation automatically and by power means from a position remote from the outrigger jacks; and whereby the power operated construction shall be compactly mounted upon the vehicle frame and the manually operated stabilizer construction in a compact manner which will greatly rigidify and strengthen the entire association of these elements.

Figure 1:
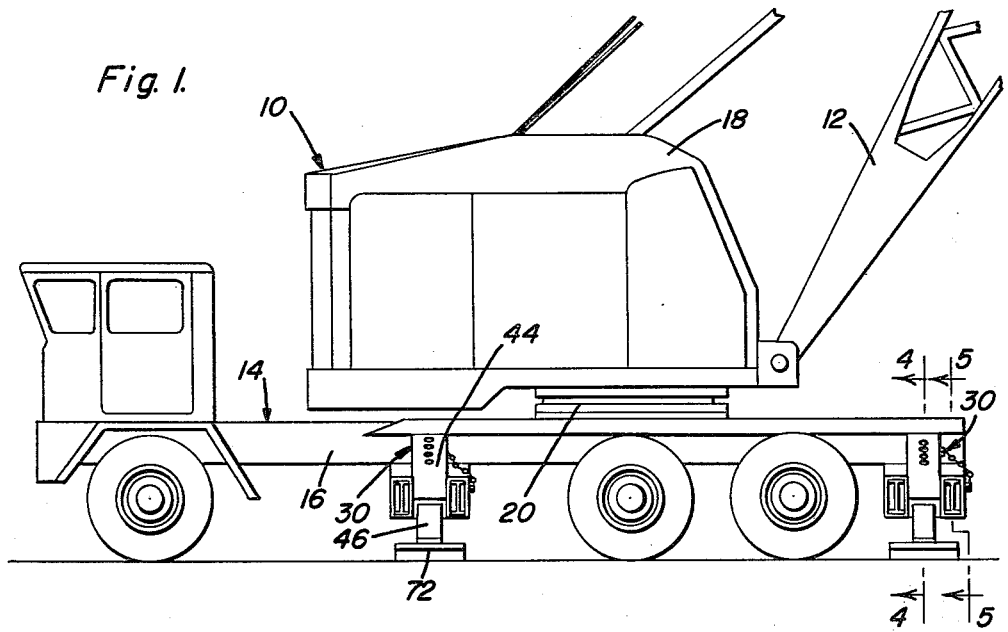
FIGURE 1 is a side elevational view of a power operated crane showing the manner in which the stabilizer construction in accordance with this invention is mounted thereon, the stabilizer construction being shown with the power operated stabilizer in its extended or operative position.

Referring first to FIGURE 1 it will be observed that the numeral 10 designates generally a vehicle such as a motor crane having the usual crane boom or mast 12 thereon and to which the principles of this invention are applied. It will be observed that the motor crane includes a mobile chassis indicated generally by the numeral 14 and which includes as will be best apparent from FIGURES 4–6, a pair of longitudinally extending laterally spaced side frame members 16 of a conventional design. Upon the chassis 14 and the cab 18 is mounted as by a turntable 20 for horizontal swinging movement about a vertical axis by the provision of any conventional operating means, not shown. In a device of this character it is obvious that when the cab is turned so that the boom 12 extends to one side of the vehicle rather than along the longitudinal axis thereof, the load imposed upon the boom has a great lever arm which tends to and sometimes when operated by unskilled labor will tilt the vehicle about its longitudinal axis and overturn the same. It is to counteract lateral forces produced when the boom 12 or other load bearing portion of the motor vehicle is directed laterally to one side thereof that the outrigger construction of this invention is especially applicable.

As shown in FIGURE 1 and designated generally by the numeral 30 therein there are provided one or more outrigger stabilizer constructions which are mounted at suitably longitudinally spaced positions upon the vehicle chassis. These outrigger constructions in accordance with this invention combine the conventional manually operated outrigger with a power operated outrigger in a novel and greatly improved manner to thereby increase the ease of operation and the efficiency of the outrigger construction.

Figure 2:
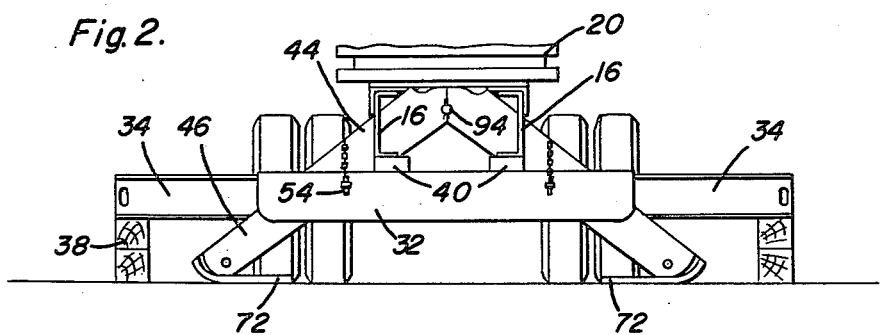
FIGURE 2 is an end elevational view of the invention of FIGURE 1 taken from the right hand side thereof and showing both the manually operated and the power operated stabilizers extended into their operative positions.

Referring now especially to FIGURES 4–6 it will be seen that each outrigger construction 30 consists of a pair of cross members each designated by the numeral 32 and which are preferably rectangular in cross-section and which are rigidly and fixedly secured to the underside of the side frame members 16 and extend transversely thereof and therebeyond. Slidably received in each of the hollow cross members 30 is a rigid extension in the form of an I-beam or the like 34 which may be provided with hand holes 36 whereby to facilitate manual sliding of the extensions to their outwardly extended position as shown in FIGURE 2 and in which position they may rest upon suitable supports shown at 38 to thereby impart stabilization to the vehicle chassis; or a collapsed or contracted position such as that indicated in one of the outrigger constructions 30 shown in FIGURE 6 or as shown in FIGURE 5.

It will be observed that there are provided brace members in the form of spacer blocks 40 which extend across and rest upon the top surface of each pair of the cross members 32 and engage the undersurface of the side frame members 16 being welded to these elements to thereby rigidly attach and connect the cross members to the frame members of the chassis and to each other in a side-by-side spaced relation.

Figure 3:
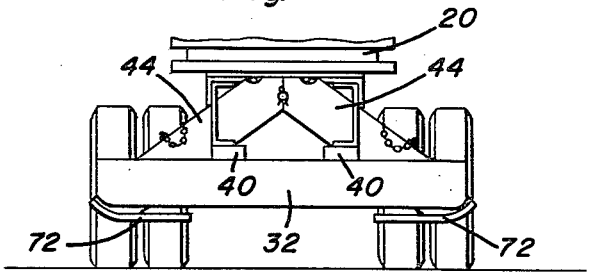
FIGURE 3 is a view similar to FIGURE 2 but showing both stabilizers in their retracted position.

Each outrigger assembly 30 includes a pair of longitudinally extensible jacks each designated generally by the numeral 42, these jacks being convergent at their upper ends to abut each other between the side frame members 16 as will be apparent from FIGURE 4 and are outwardly divergent at their lower ends. Each jack member 42 is snugly received between the pair of cross members 32 and includes telescoping upper and lower members 44 and 46 which are preferably of square cross-section with the lower member 46 being slidable and guidingly received in the open lower end of the upper member 44. A plurality of longitudinally spaced registrable apertures 48 in the upper member and 50 in the lower member are adapted to receive a locking pin 52 which will be secured to the upper member or any suitable place by a retaining chain 54. The arrangement is such that the pin may be dropped into registering apertures into the two upper and lower members to thereby retain the lower member in its retracted or partially retracted position, as shown in FIGURE 3 or FIGURE 6 in order to provide road clearance between the outrigger construction and the terrain on which the motor vehicle rests or in its extended position.

An important feature of this invention resides in the manner in which these jacks 42 are mounted upon the vehicle and in the outrigger constructions 30. As shown best in FIGURE 4, the side frame members 16 are provided with notches 60 therethrough of sufficient size to snugly receive therein the upper member 44. Similarly, the brace members 40 are provided with inclined faces 62, see FIGURE 4 in particular, which likewise bear against corresponding faces on the underside of the upper members 44. The upper members are then rigidly secured to both the side frame members and to the braces 40 as by welding as at 64 and 66. At the same time, the lower portions of the upper members 44 are received between and embraced by the pair of cross members 32 and are likewise welded or otherwise rigidly secured thereto. Thus the upper members 44 are rigidly connected to the side frame members 16, the brace blocks 40 and the cross members 32 of the manually operated outrigger stabilizers to thereby impart great rigidity and strength to the entire outrigger assembly 30.

Another very important feature of the invention resides in rigidly securing the jacks 44, 46 to the chassis at such a position or angle to the vertical that the vehicle load thereon will be supported upon the slidingly engaged members 44, 46 at their engaged surfaces and will not be imparted to any substantial extent at least to the pressure operating means within the members 44, 46. The power operating means are thus relieved of the load of the vehicle and are used merely to positively extend or retract the jack members, thereby reducing wear and increasing the life of the structure.

As will be observed by an inspection of FIGURES 4 to 8, the lower ends of the lower members 46 are provided with apertures extending transversely therethrough as at 70 and have a curved or contoured lower edge. A foot member 72 in the form of a flat plate having an upwardly curving end 74 is detachably secured to each lower member 46 of a jack 42 with the contoured edge of the member 46 bearing upon the upwardly curving end 74. For this purpose the foot member has rising from the curved end 74 a hollow box-like projection 76 likewise provided with transversely aligned apertures 78 adapted to register with apertures 70 in the lower member 46, and further with an opening 80 extending from the upper end of the lug 76 into the interior of the same. The arrangement is such that as will be seen from FIGURE 4, the shoe 72 may be retained upon the lower end of a lower member 46 by inserting the boss or projection 76 into the open lower end of the lower member 46, while telescoping threadedly engaging fastener components 82 and 84 constitute a common fastening means extending through the aligned apertures 70, 78 and through the opening or recess 80. It will be noted that the thrust of the hydraulic cylinder and piston unit is imparted to the foot member 72 directly through the abutting engagement of the contoured lower end of the member 46 against the curved end 74 of the foot member and not through pin 82, 84.

A power operating means is housed in each of the jacks 42 and is secured to both the upper and lower members 44 and 46 thereof. As shown in FIGURE 4, this power operating means consists of a fluid pressure operated cylinder and piston unit the same including a fluid pressure actuating cylinder 86 and a piston 88 slidable therein, the piston having the usual piston rod 90 whose lower end is received within the chamber 80 of the projection 76 and is pivotally retained therein by the common fastener 82, 84 previously mentioned.

From a comparison of FIGURE 4 with FIGURE 7 it will be observed that the upper ends of the cylinders 86 are provided with lugs as at 92 which are apertured to receive a pin 94 therebetween, this pin extending through the walls of the aligned abutting upper ends of the upper members 44 to thus pivotally mount the upper ends of the two fluid pressure operated cylinders.

By means of suitable conduits 96 fluid pressure from any suitable source of remote control and supply, not shown, is fed to the opposite ends of the cylinders 86 to thereby individually, selectively or in unison positively extend or retract these cylinder and piston units and thus effect the sliding telescoping action of the upper and lower members of the jacks.

As will be more especially noted in FIGURES 5 and 6, the upper ends of the hollow upper members 44 are cut off upon a slant and are open at their tops in order to position these upper ends between the side frame members 16 and below the bed of the vehicle which is mounted thereon, whereby an opening in the vehicle bed will permit convenient and easy access to the fluid pressure supply lines to the cylinder units 86; and will enable the power operated cylinder and piston units and the inner or lower members 46 to be easily withdrawn from or inserted into these open upper ends as a unitary assembly through removing of the single locking and retaining pin 94.

From the foregoing it is believed that the operation of this outrigger stabilizing structure will now be readily apparent. When it is desired to move the motor crane or other vehicle to which the stabilizer construction is applied, the manually operated outrigger extensions 34 are slid into the housing afforded by the hollow cross members 32 and thus are fully retracted as shown in FIGURES 3, 5 and in one of the units 30 in FIGURE 6. The lower members 46 of the jacks 42 are moved by the power operating means of the cylinders and pistons 86, 88 into their raised or retracted positions therein, being retained therein by engagement of the locking pins 52 in the registering apertures 48 and 50 of the upper and lower members as shown in FIGURE 5 or FIGURE 3, whereby the jacks are retained in their contracted position so as to provide maximum clearance between the outrigger construction and the roadbed or surface upon which the vehicle is supported. In the fully retracted positions of the lower members 46, the curved ends 74 of the feet 72 overlap and thus retain the ends of the I-beams 34 in their retracted position, as in FIGURES 3, 5 and 6.

After the vehicle has reached its destination and it is desired to place the stabilizer outriggers in use, it is merely necessary to remove the locking pins 52 and partially extend the members 46 to cause the foot ends 74 to release the extensions 34 and then to manually extend the extensions 34 and place the supports 38 therebeneath as shown in FIGURE 2. Either supplementing this operation or as a substituting therefor, the jacks 42 may be operated by fluid pressure, after the locking pins 52 have been disengaged from the recesses 48 and 50, fluid pressure is supplied to the cylinders 86 to move the pistons 88 downwardly therein and thus extend the lower members 46 from the upper members 44 and cause the shoes 72 to engage upon the roadbed or other surface thereby producing a laterally braced stabilizing support for the vehicle. Thereafter the locking pins 52 may be again engaged. As above pointed out, the inclination of the slidable sections 44 and 46 is such that the vehicle load upon the jacks is taken by the members 44 and 46 and not by the power means 86, 88 so that in the event of any failure of the power means, the extensible jacks 42 will not collapse, the locking pin 52 comprising an additional safety feature for this purpose.

This construction possesses the advantages that while providing for independent use of as well as joint use of the manually operated stabilizer outriggers and the power operated outriggers, there is produced a very considerable rigidifying and bracing effect between these members and the side frame members of the vehicle thus promoting the efficiency of the outrigger operation. Further, it is easy to remove, as required for servicing, replacement or the like the power operating means from an individual jack by merely disconnecting the shoe from the lower end thereof, the withdrawal of the fastening members 82 and 84 releasing the lower end of the piston rod from the shoe 72, then pulling the pin 94 permits the entire unit to be drawn upwardly through the telescoping upper and lower members and through the side frame members of the vehicle chassis through the opening provided for this purpose in the platform or bed of the vehicle.

When the jack is being extended by its hydraulic operating means, the foot member will slide outwardly along the ground or supporting surface. The curved outer end 74 of the foot facilitates such sliding movement and prevents any tendency of the foot to dig into the ground which would in turn tend to tilt or unevenly lift the vehicle or apparatus.

The curved foot structure thus has the very important functions of facilitating sliding of the foot on the ground and also acts as a retainer to secure the manually operated outriggers in their retracted positions.

Although as illustrated herein and described hereinbefore the two upper members 44 are separately formed and mounted, it is within the purview of this invention to form the two inclined upper members as a rigidly connected or as an integral unitary assembly which is placed as a unit in the notches formed in the frame members to receive them.

It will be understood that the opening in the top of the members 44 is of such size that it provides for a clearance equal to the full cross-sectional area of each of the members 44 and in alignment therewith.

The brace blocks 40 also have several very important functions. They serve to strengthen the frame members 16 where they have been weakened and almost cut in two by the notches 64; rigidifying the connection of the upper members to the frame members 16 and to the housings 32; rigidifying the connection of the housings 32 to each other and to the frame members 16.

A very important advantage of this invention is the large number of possible manners of using the outriggers singly or collectively. It is possible to extend each manually operated outrigger 34 from either end of its housing 32 so that both can be on either side of the vehicle or either can be used alone on either side. In conjunction with this variety of uses, the power operated legs likewise can be individually or simultaneously employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An outrigger construction for vehicles of the type having a wheeled chassis provided with longitudinally extending spaced side frame members, said construction comprising a pair of extensible jacks each secured to and carried at its upper portion by said chassis, said jacks each being downwardly divergent from their upper ends, each jack comprising telescoping upper and lower members, said upper members being each rigidly secured to one of said chassis frame members and extending into the space between said side frame members, said lower members each extending laterally outwards of said chassis frame members and below the latter, operating means in each jack connected to the upper and lower members thereof for effecting positive extension and retraction of said members.

2. The combination of claim 1 including a load bearing shoe secured to the lower end of each lower member, said operating means being connected to said shoe.

3. An outrigger construction for vehicles of the type having a wheeled chassis provided with longitudinally extending spaced side frame members, said construction comprising a pair of extensible jacks each secured to and carried at its upper portion by said chassis, said jacks being downwardly divergent from their upper ends, each jack comprising telescoping upper and lower members, said upper members being each rigidly secured to one of said chassis frame member, said lower members each extending laterally outwards of said chassis frame members and below the latter, operating means in each jack connected to the upper and lower members thereof for effecting positive extension and retraction of said members, said chassis frame members being notched, said upper members extending each through a notch in a chassis frame member.

4. The combination of claim 3 wherein the upper ends of said upper members are engaged in endwise abutment with each other between said chassis frame members.

5. An outrigger construction for vehicles of the type having a wheeled chassis provided with longitudinally extending spaced side frame members, said construction comprising a pair of extensible jacks each secured to and carried at its upper portion by said chassis, said jacks being downwardly divergent from their upper ends, each jack comprising telescoping upper and lower members, said upper members being each rigidly secured to one of said chassis frame member, said lower members each extending laterally outwards of said chassis frame members and below the latter, operating means in each jack connected to the upper and lower members thereof for effecting positive extension and retraction of said members, a pair of cross members extending transversely of said chassis frame members, said cross members embracing said jacks, means rigidly securing said cross members to said jacks and to said chassis frame members.

6. The combination of claim 5 wherein said securing means includes brace blocks fixedly secured each to a chassis frame member and to said pair of cross members and to an upper member.

7. The combination of claim 6 wherein said brace blocks are each disposed between said cross members and a chassis frame member.

8. The combination of claim 7 wherein each brace block has a flat surface disposed in face to face engagement with one of said upper members.

9. An outrigger construction for vehicles of the type having a wheeled chassis provided with longitudinally extending spaced side frame members, said construction comprising a pair of extensible jacks secured to and carried by said chassis, said jacks being downwardly divergent from their upper ends, each jack comprising telescoping upper and lower members, said upper members being each rigidly secured to a frame member, said lower members each extending laterally outwards of said frame members and below the latter, operating means in each jack connected to the upper and lower members thereof for effecting positive extension and retraction of said members, a pair of cross members extending transversely of said frame members, said cross members embracing said jacks, means rigidly securing said cross members to said jacks and to said frame members, said securing means including brace blocks fixedly secured each to a side frame member and to said pair of cross members and to an upper member, said brace blocks being each disposed between said cross members and a frame member, extensions slidably mounted upon said cross members and laterally extensible thereon from said chassis for providing an adjustable stabilizer support for said vehicle.

10. An outrigger construction for vehicles of the type having a wheeled chassis provided with longitudinally extending spaced side frame members, said construction comprising a pair of extensible jacks secured to and carried by said chassis, said jacks being downwardly divergent from their upper ends, each jack comprising telescoping upper and lower members, said upper members being rigidly secured to a frame member, said lower members each extending laterally outwards of said frame members and below the latter, operating means in each jack connected to the upper and lower members thereof for effecting positive extension and retraction of said members, cross members extending transversely of said frame members, extensions slidably mounted upon said cross members and laterally extensible thereon from said chassis for providing an adjustable stabilizer support for said vehicle.

11. An outrigger construction for vehicles of the type having a wheeled chassis provided with longitudinally extending spaced side frame members, said construction comprising a pair of extensible jacks each secured to and carried at its upper portion by said chassis, said jacks being downwardly divergent from their upper ends, each jack comprising telescoping upper and lower members, said upper members being each rigidly secured to one of said chassis frame member, said lower members each extending laterally outwards of said chassis frame members and below the latter, operating means in each jack connected to the upper and lower members thereof for effecting positive extension and retraction of said members, a plurality of longitudinally spaced registering apertures in said upper and lower members, a locking pin selectively received in registering apertures for maintaining said lower means in a retracted position in said upper members.

12. An outrigger construction for vehicles of the type having a wheeled chassis provided with longitudinally extending spaced side frame members, said construction comprising a pair of extensible jacks each secured to and carried at its upper portion by said chassis, said jacks being downwardly divergent from their upper ends, each jack comprising telescoping upper and lower members, said upper members being each rigidly secured to one of said chassis frame member, said lower members each extending laterally outwards of said chassis frame members and below the latter, operating means in each jack connected to the upper and lower members thereof for effecting positive extension and retraction of said members, said upper members being cut away at their upper ends to provide an opening through which said lower members and said operating means may be passed.

13. An outrigger construction for vehicles of the type having a wheeled chassis provided with longitudinally extending spaced side frame members, said construction comprising a pair of extensible jacks each secured to and carried at its upper portion by said chassis, said jacks being downwardly divergent from their upper ends, each jack comprising telescoping upper and lower members, said upper members being each rigidly secured to one of said chassis frame member, said lower members each extending laterally outwards of said chassis frame members and below the latter, operating means in each jack connected to the upper and lower members thereof for effecting positive extension and retraction of said members, said pair of jacks being inclined to the vertical at an angle sufficient to cause the weight of the vehicle upon the jacks to prevent any sliding of the telescoping members upon each other due to the weight of the vehicle whereby to relieve the operating means from the weight of the vehicle.

14. An outrigger construction for vehicles of the type having a wheeled chassis provided with longitudinally extending spaced side frame members, said construction comprising a pair of extensible jacks secured to and carried by said chassis, said jacks being downwardly divergent from their upper ends, each jack comprising telescoping upper and lower members, said upper members being each rigidly secured to a frame member, said lower members each extending laterally outwards of said frame members and below the latter, operating means in each jack connected to the upper and lower members thereof for effecting positive extension and retraction of said members, a pair of transversely extending menually operable stabilizers secured to the underside of said chassis, retaining means on said lower members engageable in the retracted position of the latter with said manually operated stabilizers for restraining the latter in their retracted position.

15. An outrigger construction for vehicles of the type having a wheeled chassis provided with longitudinally extending spaced side frame members, said construction comprising a pair of extensible jacks secured to and carried by said chassis, said jacks being downwardly divergent from their upper ends, each jack comprising telescoping upper and lower members, said upper members being each rigidly secured to a frame member, said lower members each extending laterally outwards of said frame members and below the latter, operating means in each jack connected to the upper and lower members thereof for effecting positive extension and retraction of said members, a pair of transversely extending manually operable stabilizers secured to the underside of said chassis, said frame members having notches, said upper members extending each through a notch, said manually operated stabilizers embracing opposite sides and being fixedly secured to said upper members.

16. The combination of claim 15 including brace blocks each underlying a frame member and extending arms and being fixedly secured to an upper member and to said manually operated stabilizers.

References Cited in the file of this patent

UNITED STATES PATENTS

| 2,436,799 | Frost | Mar. 2, 1948 |
| 2,740,538 | Felkner | Apr. 3, 1956 |
| 2,961,102 | Pitman | Nov. 22, 1960 |